United States Patent
Jackson et al.

[15] 3,700,273
[45] Oct. 24, 1972

[54] ENERGY ABSORBING BUMPER SYSTEM

[72] Inventors: George W. Jackson; Paul J. Long, Jr.; Wayne V. Fannin, all of Dayton, Ohio

[73] Assignee: General Motors Corporation, Detroit, Mich.

[22] Filed: Nov. 19, 1970

[21] Appl. No.: 91,008

[52] U.S. Cl. .....................293/70, 293/89, 267/139, 213/223
[51] Int. Cl. ...........................B60r 19/02, F16f 9/06
[58] Field of Search........293/1, 9, 24, 60, 70, 73, 85, 293/86, 89, DIG. 2; 267/64 R, 116, 139, 140; 213/43, 223

[56] References Cited

UNITED STATES PATENTS

| | | |
|---|---|---|
| 2,963,175 | 12/1960 | Thornhill....................213/223 |
| 2,508,347 | 5/1950 | Marsh...........................29/164 |
| 2,348,160 | 5/1944 | Thornhill..................267/64 R |
| 2,618,478 | 11/1952 | Conway....................267/64 R |
| 2,167,928 | 8/1939 | Johnson....................267/64 R |
| 3,008,746 | 11/1961 | Senger..........................293/70 |

Primary Examiner—Gerald M. Forlenza
Assistant Examiner—Robert Saifer
Attorney—W. E. Finken and D. L. Ellis

[57] ABSTRACT

An energy absorbing bumper system for automotive vehicles includes a pair of fluid-filled telescopic cylinder units at respective ends of the bumper mounting the same to the vehicle chassis. Variable volume fluid chambers within each unit have the fluid flow therebetween controlled by a floating orifice and metering rod and one of the chambers is bounded by a gas piston urged by a body of compressed gas to force the telescopic mounting unit to a definite extended or normal position wherein the cylinders of the unit are snugly interengaged to resist relative radial displacement in rough road conditions and the like.

5 Claims, 4 Drawing Figures

Patented Oct. 24, 1972

3,700,273

INVENTORS
George W. Jackson,
Paul J. Long, Jr. &
BY Wayne V. Fannin

D. L. Ellis
ATTORNEY

ENERGY ABSORBING BUMPER SYSTEM

This invention relates to energy absorbing bumper assemblies for automotive vehicles and more particularly to improved hydraulic type energy dissipating chassis mounting units for automotive bumpers.

In the application of energy absorbing devices or units of the hydraulic type to the impact bumper assemblies of automotive vehicles, paramount concerns in the durability and performance of such units are the somewhat conflicting needs for relatively free sliding movement between telescopic portions of the unit, even under loading applied at substantial angles to the axis of the unit, the prevention of any substantial leakage of fluid in the units in extended service, and the requirement of rigidity in those parts of the unit relied upon to suspend or mount the bumper on the vehicle.

On the concern for proper sliding performance even under forces angular to the unit axis in their energy absorbing excursions, the telescopically related members of the unit should not bind on or deform one another and should readily accommodate the severe forces and nonuniform displacement that arise between the two ends of the bumper as occurs during cornering impacts on only one side of the bumper. Yet, the design of the units must be such that in their normal extended condition they are sufficiently rigid to withstand the impulses and vibration of rough road operation and the forces applied to the bumper bar during jacking or towing of the vehicle.

The primary feature of this invention is that it provides an improved hydraulic type energy absorbing unit for automotive vehicle bumper systems adapted to accomplish these objectives. A specific feature of this invention is the arrangement within such an hydraulic energy absorbing bumper mounting unit of telescopically arranged members properly sized and fitted with bearings for relatively free sliding during variously angularly applied impact loadings on the bumper bar but which include stabilizing means for snugly interengaging these members in a normal extended position through utilization of tapering surfaces adapting the cylinders to withstand severe rough road shake and jacking and towing forces. Yet more specifically, the invention features specially selected frusto-conical surfaces, in the case of cylinder members, interengageable under the force of bumper restoring biasing means within the unit in the form of a body of compressed gas or the like urging the unit to a maximum extended position which is defined by the relative location of the interengaging surfaces on the cylinders.

Further in the interest of accommodating whatever limited beaming or like deflection that may occur in the unit during free sliding energy absorbing excursions and additionally in the interests of accommodating limited manufacturing variations, the invention features the use of a tapered or varying cross section metering pin and orifice combination wherein the pin is rigidly affixed to one of the telescoping members and the piston associated with the other member carries a floating annular orifice member radially slidable to accept whatever misalignment that may occur between the metering rod and the piston.

These and other features and advantages of the invention will be readily apparent from the following specification and from the drawings wherein.

Figures 1, 2, 3, 4:
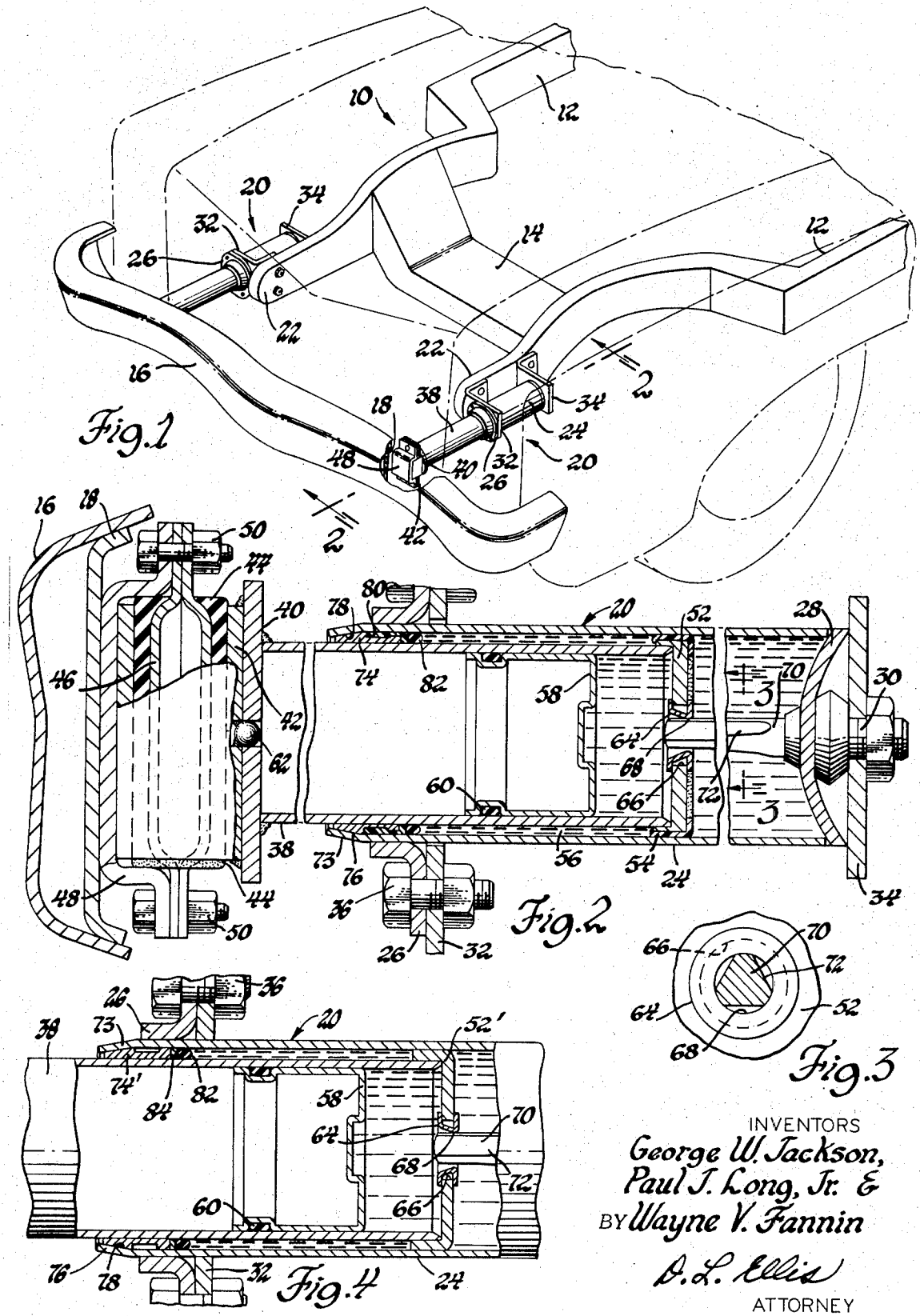
FIG. 1 is a perspective view of an automotive vehicle chassis frame including an energy absorbing bumper assembly according to this invention.
FIG. 2 is an enlarged sectional view taken generally along the plane indicated by lines 2—2 of FIG. 1 showing the bumper bar in its normal extended position.
FIG. 3 is a sectional view taken generally along the plane indicated by lines 3—3 of FIG. 2.
FIG. 4 is a view similar to FIG. 2 showing a modification of the invention.

Referring now particularly to FIG. 1 of the drawings, reference numeral 10 generally designates a separate chassis frame of an automotive vehicle which typically includes a laterally spaced pair of longitudinally extending side rails 12 interconnected in the forward portions of the frame by a front cross member 14. It will be understood that rather than the separate chassis frame illustrated herein, the automotive bumper applications of this invention are equally well adapted to be employed in unibody construction.

The bumper assembly includes a generally conventional impact bumper or face bar 16 which, as seen best in FIG. 2, includes an inner reinforcing plate 18. Energy absorbing chassis mount units, each designated generally as 20, are provided adjacent each end of bumper bar 16 for rigid attachment between reinforcing plate 18 and forward horns 22 of the side rails 12.

Referring to FIGS. 1 and 2, each mounting unit 20 includes an outer cylinder 24 of a selected stock thickness suitable to the contemplated impact fluid pressure and normal bumper mount loadings to be encountered. Adjacent its outer or forward end, each cylinder 24 has welded thereto a surrounding bracket 26 extended with an annular portion embracing the cylinder and a flange provided with bolt holes, while at its inner or rearward end, the cylinder is closed by a cap 28 which may have welded or otherwise rigidly affixed centrally thereto a threaded stud 30. On each frame horn 22, a spaced pair of L-shaped brackets are rigidly attached, the forward one 32 of which includes an aperture for receiving cylinder 24 and has bracket 26 secured thereto by bolts 36 while the rearward one of which 34 may receive the stud 30 which is threaded over with a nut thereby to rigidly mount the cylinder 24 on the frame horn at these suitably longitudinally spaced locations of the brackets.

The mounting unit 20 further includes an inner or second cylinder member 38 also of properly chosen stock thickness and telescopically received within cylinder 24 and extending forwardly therefrom, with a weld plate 40 being provided at its outer terminal end. Welded to plate 40 is a sleeve 42 extending vertically and receiving a rubber or similar elastic bushing 44 bonded or otherwise attached intermediate the sleeve and an inner mounting bar 46 which is provided with flattened ends apertured for the reception of mounting bolts. A generally U-shaped mounting strap 48 is welded or otherwise affixed at the proper laterally spaced locations on the bumper bar reinforcing plate 18 to directly engage the outer sides of respective sleeves 42, bent ears of each strap being apertured to receive bolts 50 extending through the mounting bar 46 and threaded over with nuts to secure the bumper 16 and cylinders 38 together.

At the inner or rearward end of each cylinder 38, a wall member in the form of a cylinder cap 52 generally delineates opposite fluid chambers in the mounting unit 20 each filled with a suitable fluid such as oil. A liner or bearing sleeve 54 of glass-filled nylon or other plastic material exhibiting suitable antifriction, antiscoring and load deformation and stiffness properties is received over the cylinder cap, these properties being chosen to best accommodate the required free sliding movement in unit 20 as well as the large radial forces seen by the bearing under impact and under jacking and towing forces applied to bumper bar 16. Sufficient free sliding movement is permitted between the cylinder 24 and the sleeve 54 by provision of adequate clearance. For example, with the inner diameter of cylinder 24 approximating 2.5 inches, an outer diameter for sleeve 54 providing a total or diametrical clearance of about 0.01 inch is preferred. By the use of such clearance or additionally by shallow grooves provided in the sleeve, not shown, sufficient fluid communication is provided between the remote side of the cylinder cap 52 and the exterior of inner cylinder 38 in a cylinder interspace 56, so that the right hand fluid working chamber of unit 20 is comprised of the volume rightwardly of cylinder cap 52 as well as this interspace 56.

Within inner cylinder 38, a piston 58 fabricated of sheet metal or the like is slidably received and fitted with an O-ring 60 to adequately sealingly bound or define one side of the working fluid chamber within cylinder 38 leftward of the cylinder cap 52, as shown in the drawings. A quantity of gas is compressed within the volume between piston 58 and plate 40, such gas being injected through plate 40 by conventional techniques during unit assembly and using as a closure a ball 62 welded within the gas filling orifice in plate 40 following the gas insertion. In the typical unit 20 such as described, the inside diameter of cylinder 24 provides for an effective piston area operative on cylinder 38 of approximately 5 square inches. This, taken with initial compression of the gas, which may for example be nitrogen, of approximately 150 p.s.i. when the parts are in the normal extended position shown in FIG. 2, yields a force of approximately 750 pounds from the gas-compressed fluid urging the inner cylinder 38 in an outward direction to the normal extended position.

An orifice element 64 is received within an aperture 66 in the cylinder cap 52. Element 64 is sharp-edged at 68 and generally U-shaped in longitudinal section to include radial flanges which embrace the piston cap. The orifice element 64 is seen as being sized with some limited clearance, chosen for a purpose to be described, between its annular wall intermediate the flanges and aperture 66 so that the element may float or radially slide within the aperture.

A metering rod 70 has one end welded centrally of the cap 28, and extends forwardly to be received within the orifice element 64. The rod 70 is of basically cylindrical form and has milled or otherwise formed therein three equally spaced flats or plane surfaces 72 disposed commonly at various angles to the rod centerline over the length of the latter to exhibit varying depth relative to the gross or cylindrical dimension of the rod. As seen best in FIG. 3, the cylindrical dimension of the rod is sized closely to the diameter of orifice element 64 at sharp-edge 68 so that the element seats or is guided by the unflatted portions of the rod. Hence, during an energy absorbing excursion under impact forces telescoping cylinder 38 and piston cap 52 inwardly, any slight axial misalignment between the metering rod and aperture 66 is accommodated by the predetermined limited amount of radial floating or sliding movement of orifice element 64 permitted by its radial clearance from the edge of aperture 66. Rather than this floating orifice, it may be preferable to fix the orifice on the piston cap and mount the inner end of the metering rod movably on the cap 28, as by a swivel.

In an energy absorbing operation or excursion of units 20, and taking for example the energy of a strictly longitudinal impact force applied centrally of bumper bar 16, each unit 20 is adapted to experience an axial inward telescoping of cylinder 38 from the normal extended position shown, permitting rearward displacement of the bumper bar evenly along its length. Where the impact forces are sufficient to overcome the initial precompression of the gas spring behind piston 58, any such inward telescoping of the cylinders must of course be accompanied by displacement of fluid from the right hand working chambers in cylinders 24 through the orifice 64 and into the leftward working chambers within cylinders 38. As is known in the art, the metering rod 70 may be formed, such as by flats 72, to provide a gradually decreasing amount of orifice area between the rod and sharp-edge 68 for a gradually correspondingly increasing fluid resistance to inward motion of cylinder 38, thus to maintain a substantially constant pressurization of the right hand chamber as the velocity of unit displacement gradually decreases. This results in a generally so-called square force vs. displacement characteristic curve and in terms of such curve the product of the pressure force on the effective piston area on cylinder 38 over unit displacement times such displacement will represent the required amount of energy of impact to be absorbed by passage of metered fluid. Typically, the two units 20 will be designed to each carry a maximum pressurization force related to the strength of the regions of frame 10 to which they are attached, these maximum forces of course representing a corresponding relative velocity of impact with which a vehicle of given mass will strike, for example, a fixed solid barrier. The conformation of flats 72 may accordingly be tailored to this maximum contemplated impact velocity, and where lesser velocity impacts are imposed on units 20, lesser pressurization forces will develop therein but the entire kinetic energy thereof will nevertheless be absorbed.

Other than "square" characteristic curve performance may be desired in units 20 and, this is again easily controlled by the angle or depth of the flats 72 along the length of rod 70. In one preferred design of unit 20, the flats 72 are of constant depth over about the first one-fifth of rod length whereupon they become increasingly shallower for progressively decreasing orifice area. In this way, a purposely low initial pressure force level resulting from low fluid restriction compensates for additional structural internal loads or resistances to unit displacement that may occur in a limited initial period or stroke of impact and arising from inertia of the moving parts or friction. Following cessation of these brief additional resistances, uniformly varying depth portions of flats 72 contribute the primary and controlled resistance to unit displacement in the manner described above.

Following the absorption of the impact energy and the inward displacement of the cylinders 38, a greater portion of fluid is contained in the leftward working chambers in such cylinders thereby having forced pistons 58 leftwardly to additionally compress the gas spring behind these pistons. Potential energy imparted through this compression acts upon the release of the impact forces on the bumper bar to expand the gas spring chamber and forcibly displace the cylinders 38 and bumper bar 16 leftwardly back to the original normal extended position shown in the drawings. The working fluid is thereby forced from the leftward chambers through orifice 64 so that the units are permitted to assume their original volume, readied for repeated impacts.

As indicated hereinabove, the initial precharge of the gas behind pistons 58 is chosen to be sufficiently large to provide on the cylinders 38, even in their normal extended position shown, a force seeking to move the same further outwardly. In the interests of assuring a very rigid interconnection between each cylinder 38 and its mating cylinder 24, combined bearing and stabilizing means are provided thereon which utilize this outward thrust and in a form which includes a pair of tapering or wedge surfaces engageable in the normal extended position of the units 20. As seen best in FIG. 2, the terminal end portion 73 of cylinder 24 is provided with an inward taper by deforming the same to the desired angle following initial assembly of the cylinders in manufacture. Cylinder 38 has welded or otherwise affixed thereto at a selected location an annular bearing and stabilizing member or ring 74 having at its outer extremity a similar tapering surface 76. In the case of cylindrical forms for units 20 such as shown in the drawings, these are frusto-conical surfaces best formed with an angle to the unit centerline of not less than about 10° so that no tendency toward a mechanical locking taper results. Under the bias of the gas spring behind pistons 58 forcing cylinders 38 leftwardly, the surface 76 of stabilizing ring 74 engages snugly with the inner wall 78 of the tapered end portion 73 of cylinder 24 for rigid abutment therebetween preventing radial play or looseness in units 20 and the shake or vibration of bumper bar 16 which would otherwise result. The largest diameter of stabilizing ring 74, which provides the bearing area between the cylinders during displacement, and in keeping with the similar clearance at piston sleeve 54, is chosen sufficiently smaller than the inner diameter of cylinder 24 so that, following disengagement of the frusto-conical surfaces in an energy absorbing excursion, sliding movement between the cylinders is largely unimpeded. However, following the impact stroke, the forced return of the cylinders 38 again snugly interengages surfaces 76 and 78 for the required lateral rigidity. This largest diameter or bearing area of the stabilizing ring 74 may actually be constituted by a suitable glass-filled nylon or other plastic sleeve having properties similar to that of sleeve 54. This may take the form, as shown, of a plastic ring 80 seated in a groove in the stabilizing member and overlapped at its inward edge generally to fill the interspace 56 over a limited length. Such ring may be provided with a concave surface for nesting of a sealing O-ring 82 which prevents leakage of fluid past the stabilizing ring to the exterior of cylinder 24. With respect to interspace 56, such O-ring and stabilizing ring 74 behind it define an annular piston face complementing cylinder cap 52. If desired, the material and size of ring 80 may be specially chosen to also act as a seal, especially were it extended to overlap the taper surfaces so as to be compressed under the return force of the gas spring.

By locating the inner tapered wall 78 on the terminal end portion 73 of cylinder 24, the principal lateral load bearing region defined by surfaces 76 and 78 is located as close as possible to the mass load of bumper 16 and internal beaming deflection of cylinder 38 is minimized or eliminated. Since the tapers of surfaces 76 and 78 center the cylinder 38 relative to cylinder 24, O-ring seal 82 is advantageously located immediately adjacent these surfaces so that it will adequately seal the entire annular space 56 with substantially uniform force and compression about its periphery and thereby avoid localized compression set or tearing and scoring. Also, with the O-ring permitted to be thus located, annular space 56 may be filled with fluid with the unit extended and no open volume susceptible to accumulation of dirt, etc., is presented which might result in abrasion or other harmful effects on the outer bearing, which is here provided by stop ring 74 and ring 80, during repeated stroking of the unit.

In a modification shown in FIG. 4, the ring 80 on stabilizing member 74 and the sleeve 54 are eliminated in favor of gaining the stronger deformation resistance of metal material in the stabilizing ring and cylinder cap 74' and 52' respectively. To minimize wall scoring or abrasion during impact excursions, these bearing members or rings may be fabricated of brass, aluminum or the like. An additional packing ring 84 is provided against the stabilizing ring 74'. It is to be observed that in both embodiments, substantial distance separates these bearing members longitudinally of cylinder 38 so that, taken with the bending strength of the latter, strong support is provided for heavy bumper bars 16.

While the above description deals with a purely longitudinally centrally applied impact load on bumper bar 16, it will be appreciated that by virtue of the sleeve and bushing mounting arrangement at the forward ends of cylinders 38, the bumper assembly employing these units 20 is capable of receiving cornering impacts which substantially deflect only one end of the bumper bar and only one of the bumper units 20. In these instances, pivoting movement or relative rotation between the mounting bars 46 and the sleeves 42 is accommodated by bushing 44 during the relative rotation of the bumper bar on the frame 10.

Having thus described the invention, what is claimed is:

1. An energy absorbing mounting unit for impact bumper bars of automotive vehicles comprising inner and outer tubular members the inner of which is adapted for attachment to a said bar and the outer of which is adapted for attachment to the vehicle structural frame, said inner member being slidably received within said outer member with an annular clearance space between the walls thereof and for telescoping movement between a selected extended relationship and any of a plurality of telescoped relationships, bearing means between said members permitting relatively free telescoping movement of said members under impacts applied to said bumper bar and including a first bearing element located adjacent the terminal open end portion of said outer member and a second bearing element spaced from said first element within said outer member longitudinally a distance substantially equaling the length of said inner member enclosed by said outer member in said extended relationship of said members, said second bearing element defining fluid passage means permitting communication of fluid either side thereof, axially aligning load supporting taper surfaces on said members including a first generally taper surface on said terminal end portion of said outer member and a complementary taper surface on said inner member engageable in the extended relationship of said members, an annular sealing member disposed on said inner member immediately closely adjacent the respective said taper surface thereon and thereby uniformly sealingly engageable about its periphery between said members in an axially aligned relation with said taper surfaces engaged in the extended relationship of said members, and a quantity of fluid sealedly contained within said inner and outer members by said sealing member including within the annular volume of said annular clearance space defined between said second bearing element and said sealing member with the parts in the extended relationship thereof.

2. An energy absorbing mounting unit for impact bumper bars of automotive vehicles comprising, inner and outer tubular members the inner of which is adapted for attachment to said bar and the outer of which is adapted for attachment to the vehicle structural frame, said inner member being slidably received within said outer member with an annular clearance space between the walls thereof and for telescoping movement between a selected extended relationship and any of a plurality of telescoped relationships, bearing means between said members permitting relatively free telescoping movement of said members under impacts applied to said bumper bar and including a first bearing element mounted on said inner member at a location engageable with the terminal end portion of said outer member with the members in extended relation and a second bearing element mounted on said inner member at a location spaced from said first element longitudinally a distance substantially equaling the length of said inner member enclosed by said outer member in said extended relationship of said members, said second bearing element defining fluid passage means permitting communication of fluid either side thereof, stabilizing means on said members including a first generally frusto-conical crimp surface at the margin of said outer terminal end portion of said outer member and a complementary frusto-conical surface on said inner member engageable in the extended relationship of said members to axially align said members and provide firm lateral load bearing support between said members in said extended relationship thereof, an annular sealing member disposed on said inner member immediately closely adjacent said complementary frusto-conical surface and thereby uniformly sealingly engageable about its periphery between said members in a centered relation in the extended relationship of said members, and a quantity of fluid contained within said inner and outer members including within the annular volume of said annular clearance space defined between said second bearing element and said sealing member with the parts in the extended relationship thereof.

3. An energy absorbing mounting unit for impact bumper bars of automotive vehicles comprising, inner and outer tubular members, one of said members being adapted for attachment to the vehicle and the other thereof for attachment to a bumper bar, said inner member being relatively freely slidably received within said outer member for relative telescoping motion under impact forces applied to the bumper bar from a normal extended relationship to any of a plurality of telescoped relationships, means biasing said members to said normal extended relationship thereof, means defining a pair of variable volume fluid chambers within said members, fluid within said chambers, a metering rod rigidly affixed to one of said members, a piston wall on the other of said members and an aperture in said piston wall communicating said chambers and having projecting therethrough an end portion of said rod, and an annular orifice member including an annular wall mounted within said aperture of said piston wall to extend in a direction axially of said members past both sides of said piston wall and sized for limited radial shifting movement within said aperture, said annular wall receiving said end portion of said rod, said orifice member further including a pair of radially extending flanges integral with said annular wall and embracing said piston wall with clearance whereby said orifice member is retained on said piston wall yet is radially shiftable to accommodate axial misalignment between said rod and said aperture during telescoping movement of said members between said normal extended relationship and a maximum telescoped relationship.

4. The mounting unit recited in claim 3 wherein said metering rod is shaped generally cylindrical along its length and includes at least one varying depth flat thereon interrupting the cylindricity thereof, the cylindrical contour of said metering rod being engaged with a cylindrical inner surface of said orifice member annular wall for guiding the latter radially in said aperture.

5. An energy absorbing mounting unit for impact bumper bars of automotive vehicles comprising, inner and outer tubular members the inner of which is adapted for attachment to said bar and the outer of which is adapted for attachment to the vehicle structural frame, said inner member being slidably received within said outer member with an annular clearance space between the walls thereof and for telescoping movement between a selected extended relationship and any of a plurality of telescoped relationships, bearing means between said members permitting relatively free telescoping movement of said members under impacts applied to said bumper bar and including a first bearing element mounted on said inner member at a location engageable with the terminal end portion of said outer member with the members in extended relation and a second bearing element mounted on said inner member at a location spaced from said first element longitudinally a distance substantially equaling the length of said inner member enclosed by said outer member in said extended relationship of said members, said second bearing element defining fluid passage means permitting communication of fluid either side thereof, stabilizing means on said members including a first generally frusto-conical crimp surface at the margin of said outer terminal end portion of said outer member and complementary frusto-conical surface on said inner member engageable in the extended relationship of said members to axially align said members and provide firm lateral load bearing support between said members in said extended relationship thereof, an annular sealing member disposed on said inner member immediately closely adjacent said complementary frusto-conical surface and thereby uniformly sealingly engageable about its periphery between said members in a centered relation in the extended relationship of said members, a quantity of fluid contained within said inner and outer members including within the annular volume of said annular clearance space defined between said second bearing element and said sealing member with the parts in the extended relationship thereof, a metering rod rigidly affixed to one end of said outer member within the same, a piston wall formed at the inner end of said inner member and including an aperture centrally therein, said piston wall defining variable volume fluid chambers, and an annular orifice member including an annular wall mounted within said aperture and sized for limited radial shifting therewithin and a pair of radially extending integral flanges embracing said piston wall with clearance whereby said orifice member is retained on the latter yet is radially shiftable relative thereto to accommodate axial misalignment between said rod and said aperture during telescoping of said members.

* * * * *